No. 871,154. PATENTED NOV. 19, 1907.
G. E. WOOD.
SCREW DRIVER.
APPLICATION FILED JAN. 17, 1905.
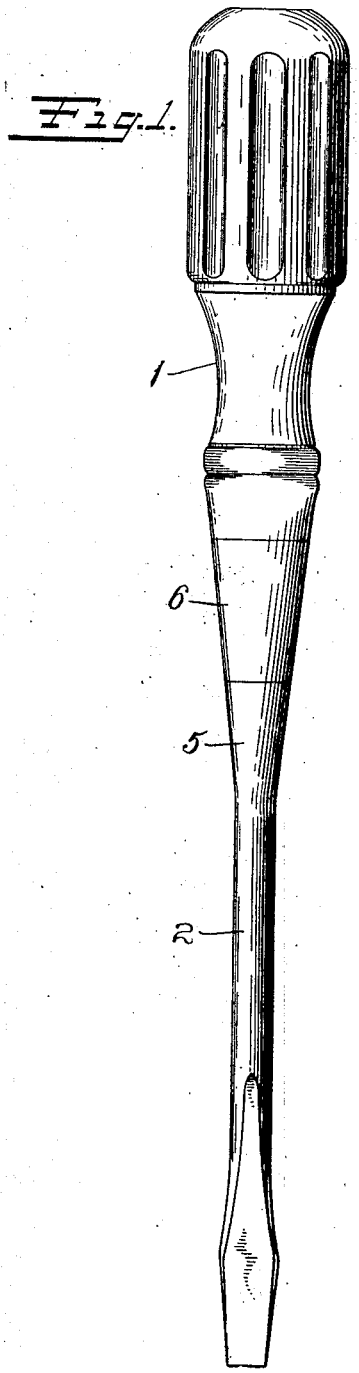
Fig. 1.
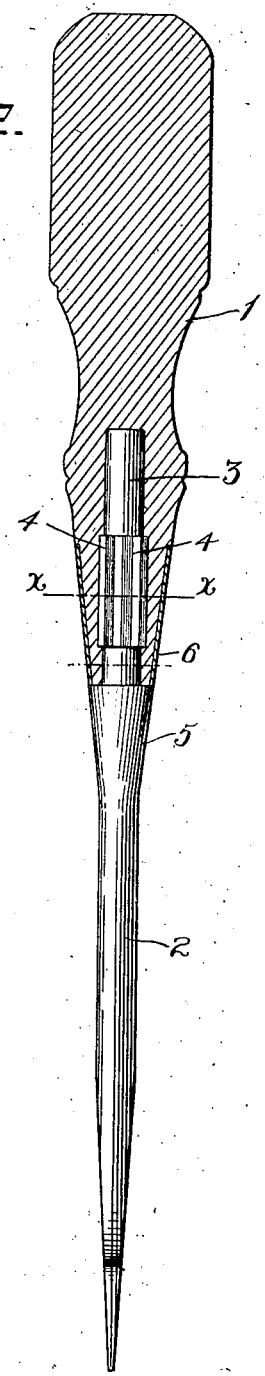
Fig. 2.
Fig. 3.
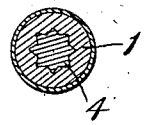
Fig. 4
Witnesses
Chas. A. Peard
R. H. S. Allyn
Inventor
George E. Wood.
By his Attorneys
Barclay, Bronson & Mulchen

UNITED STATES PATENT OFFICE.

GEORGE E. WOOD, OF PLANTSVILLE, CONNECTICUT.

SCREW-DRIVER.

No. 871,154.　　　　Specification of Letters Patent.　　Patented Nov. 19, 1907.

Application filed January 17, 1905. Serial No. 241,444.

*To all whom it may concern:*

Be it known that I, GEORGE E. WOOD, a citizen of the United States, residing at Plantsville, Connecticut, have invented certain new and useful Improvements in Screw-Drivers, of which the following is a full, clear, and exact description.

My invention relates to tools and particularly to screw drivers.

My main object is to provide a tool of this character which will be of great strength and durability and which may be economically manufactured.

In particular, my object is to provide a means whereby the parts of the tool will be held in positive connection, each with the other, and furthermore, I aim to provide a new and improved means for taking up the longitudinal thrust and the rotary movement of the handle portion, thereby making it a practical impossibility for the shank to be accidentally driven up into the handle or for either of the parts to be rotated relatively to the other.

To that end my invention consists in the parts and combination of parts hereafter described.

In the accompanying drawings, Figure 1 is a side elevation of a screw driver embodying my invention. Fig. 2 is a side elevation of the same, the handle portion being shown in longitudinal section. Fig. 3 is a horizontal section of the same on the line x—x of Fig. 2. Fig. 4 is a cross section of the tool shank showing the longitudinal ribs or spurs therein in end elevation.

1 is a handle made preferably of wood and provided with a longitudinal bore at its lower end. 2 is a metal shank, the upper portion 3 of which is blunt ended and extends into and fits the bore of said handle 1. 4—4 are longitudinal flanges or ribs integral with said shank and formed in any suitable manner, as, for instance, by dies, the said projections extending laterally beyond the surface of the shank so as to cut into the material of the handle 1. 5 is an abutment, also formed integral with the shank 2, said abutment being formed preferably by upsetting the shank 2.

6 is a ferrule surrounding the lower end of the handle.

In the assembling of this device a bore is formed in the lower portion of the handle of sufficient size to permit of the introduction of the shank. The ferrule is then forced on to the handle, and the shank, after being inserted into the bore, is driven therein so that the inner end rests against the handle at the inner end of the bore, and the abutment 5 rests against the ferrule 6.

In the form shown, I have provided a ferrule of considerable length relative to the length of the handle; thus it will be noticed that that portion of the handle in which the lateral projections of the shank are inserted is protected by said ferrule so that any tendency on the part of the wood, or other substance of which the handle is formed, to split, as for example, by reason of a twisting movement exerted thereon, will be prevented by said ferrule.

In a screw driver as above constructed, it will be seen that it is possible to subject the tool to the severest usage without driving the shank into the handle or affecting in the least its position with relation thereto, the longitudinal thrust of the shank being taken up partly by the handle 1 and partly by the ferrule 6.

It will be observed that the abutment 5 also serves to cover the slits in the material of the handle within the end of the ferrule formed by assembling the shank and the handle.

In the preferred form the abutment partakes of the same taper as the ferrule so that the article as a whole assumes the appearance of the so called socket screw driver.

Having described my invention, what I claim is:

1. In a device of the character described, a wooden handle having a tapered inner end, a ferrule fitted to and supported upon said tapered portion, a shank, a longitudinal rib or flange thereon standing beyond the surface of said shank, the greatest diameter of said shank at said ribbed portion being less than the smallest diameter of the ferrule, a central bore in the handle portion arranged to receive the shank, the rib thereof cutting into the material of the handle at the side of said bore, and an abutment on said shank of greater diameter than the diameter of that part of the shank projecting into the handle, said abutment taking a bearing against and covering the inner extremity of said ferrule.

2. In a device of the character described, a wooden handle having a tapered inner end, a ferrule fitted to and supported upon said tapered portion, a shank, a longitudinal rib or flange thereon standing beyond the surface of said shank, the greatest diameter of said shank at said ribbed portion being less than the smallest diameter of the ferrule, a central bore in the handle portion arranged to receive the shank, the rib thereof cutting into the material of the handle at the side of said bore, and an abutment on said shank of greater diameter than the diameter of that part of the shank projecting into the handle, said abutment taking a bearing against and covering the inner extremity of said ferrule and forming a flush joint therewith.

Signed at New Britain, Conn., this 14th day of January, 1905.

GEORGE E. WOOD.

Witnesses:
   H. S. WALTER,
   W. J. WORAM.